US010234842B2

(12) United States Patent
Koide

(10) Patent No.: US 10,234,842 B2
(45) **Date of Patent: *Mar. 19, 2019**

(54) NUMERICAL CONTROLLER FOR CORNER PATH OPTIMIZATION

(71) Applicant: FANUC CORPORATION, Minamitsuru-gun, Yamanashi (JP)

(72) Inventor: Naoya Koide, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 193 days.

This patent is subject to a terminal disclaimer.

(21) Appl. No.: 15/443,316

(22) Filed: Feb. 27, 2017

(65) Prior Publication Data

US 2017/0248935 A1 Aug. 31, 2017

(30) Foreign Application Priority Data

Feb. 29, 2016 (JP) ................................ 2016-037374

(51) Int. Cl.
*G06F 19/00* (2018.01)
*G05B 19/29* (2006.01)
*G05B 19/4103* (2006.01)

(52) U.S. Cl.
CPC ......... *G05B 19/29* (2013.01); *G05B 19/4103* (2013.01); *G05B 2219/34088* (2013.01); (Continued)

(58) Field of Classification Search
CPC ...................................................... G05B 19/29
(Continued)

(56) References Cited

U.S. PATENT DOCUMENTS 6,922,606 B1 * 7/2005 Yutkowitz .............. G05B 19/00 318/560
2004/0183494 A1 * 9/2004 Nagaoka ................ G05B 19/19 318/632

(Continued)

FOREIGN PATENT DOCUMENTS

JP 2002103256 A 4/2002
JP 2004005049 A 1/2004

(Continued)

OTHER PUBLICATIONS

Decision to Grant a Patent for Japanese Application No. 2016-037374, dated Jun. 5, 2018 with translation, 6 pages.

*Primary Examiner* — Mohammad Ali
*Assistant Examiner* — Md Azad
(74) *Attorney, Agent, or Firm* — RatnerPrestia

(57) ABSTRACT

A numerical controller includes a path conversion unit for obtaining a curved correction path passing through three points corresponding to a start point and an end point of a third block, and a shift point obtained by shifting an intermediate point of a command path based on the third block in an inward direction of a corner path within a limit of a preset allowable error amount when the corner path is formed by a series of blocks and a tangential direction of the corner path is continuous, and generating a path obtained by replacing the command path of the third block included in the corner path by the correction path, the third block commanding curvilinear movement at a larger curvature than a first curvature and a second curvature being interposed between the first block.

2 Claims, 7 Drawing Sheets

N01 BLOCK
N02 BLOCK
SHIFT
TOLERANCE L
SHIFT POINT
CORRECTION PATH
N03 BLOCK

(52) U.S. Cl.
CPC .............. *G05B 2219/35159* (2013.01); *G05B 2219/49164* (2013.01)

(58) Field of Classification Search
USPC .......................................................... 700/187
See application file for complete search history.

(56) References Cited

U.S. PATENT DOCUMENTS

2011/0166693 A1* 7/2011 Nishibashi ......... G05B 19/4103
700/187
2014/0025194 A1 1/2014 Koide

FOREIGN PATENT DOCUMENTS

JP 2008046899 A 2/2008
JP 2014-21759 A 2/2014

* cited by examiner

NUMERICAL CONTROLLER FOR CORNER PATH OPTIMIZATION

BACKGROUND OF THE INVENTION

1. Field of the Invention

The present invention relates to a numerical controller, and particularly relates to a numerical controller having a function of optimizing a corner path at a corner of tangent continuity.

2. Description of the Related Art

When a block that issues a processing command is continuously executed in numerical control for controlling a machine tool, and a direction of movement changes at a joint of blocks (hereinafter referred to as a block junction), a shock may be generated in the tool. To control such a shock, a conventional art disclosed in JP 2014-21759 A attempts to smoothly connect adjacent blocks by inserting a curve, a distance of which from a command path falls within a preset tolerance (allowable error amount), into a block junction of a processing program as illustrated in FIG. 6.

When the conventional art disclosed in JP 2014-21759 A is used, there is an effect that a cycle time of processing may be shortened since an inward turning amount of the corner path changes according to a magnitude of the tolerance in addition to controlling the shock at the block junction as described above.

Shortening of the cycle time by inserting the curve into the block junction described above may obtain a great effect when a tangential direction of the corner path is discontinuous (when a direction of movement of the tool abruptly changes before and after the block junction) as illustrated at a top of FIG. 7. However, when the tangential direction of the corner path is continuous (when the tangential direction smoothly changes in the whole corner path) as illustrated at a bottom of FIG. 7, the inward turning amount is restricted even when the curve is inserted into the block junction after increasing the tolerance, and thus a great effect may not be obtained.

SUMMARY OF THE INVENTION

In this regard, an object of the invention is to provide a numerical controller having a function of optimizing a corner path at a corner of tangent continuity.

A numerical controller according to the invention controls a machine tool processing a workpiece based on a program including a plurality of blocks, the numerical controller including a path conversion unit for obtaining a curved correction path passing through three points corresponding to a start point of a third block, an end point of the third block, and a shift point obtained by shifting an intermediate point of a command path based on the third block in an inward direction of a corner path within a limit of a preset allowable error amount when the corner path is formed by a series of blocks included in the program and a tangential direction of the corner path is continuous, and generating a path obtained by replacing the command path of the third block included in the corner path by the correction path, the third block commanding curvilinear movement at a larger curvature than a first curvature and a second curvature being interposed between the first block commanding rectilinear movement or curvilinear movement at the first curvature corresponding to a small curvature and the second block commanding rectilinear movement or curvilinear movement at the second curvature corresponding to a small curvature in the series of blocks.

In the numerical controller of the invention, the path conversion unit calculates a first inward turning amount when a curve is inserted between the first block and the third block using a predetermined algorithm, and a second inward turning amount when a curve is inserted between the third block and the second block using a predetermined algorithm, and sets a point obtained by shifting an intermediate point of a tool path commanded by the third block in the inward direction of the corner path by a shift amount to the shift point, the shift amount being obtained by subtracting a larger inward turning amount in the first inward turning amount and the second inward turning amount from the allowable error amount.

In the numerical controller of the invention, a path sufficiently turning inward within a range of a designated tolerance is obtained at a corner portion at which a tangential direction of prior and subsequent blocks is continuous, and a cycle time may be further shortened than before.

BRIEF DESCRIPTION OF THE DRAWINGS

The above-described object and characteristic of the invention and other objects and characteristics will be clear from description of examples below with reference to accompanying drawings. In the drawings.

DETAILED DESCRIPTION OF THE PREFERRED EMBODIMENTS

Hereinafter, an embodiment of the invention will be described along with drawings. First, a description will be given of a fundamental principle with regard to a scheme of optimizing a corner path of the invention.

Figure 1:
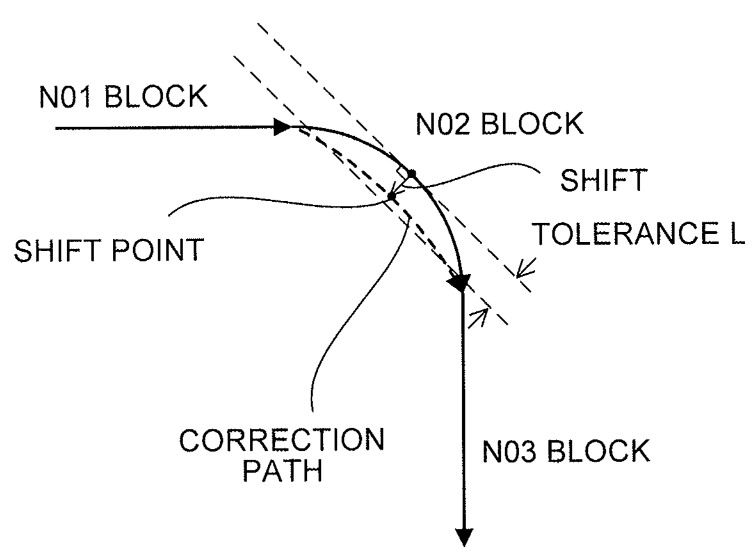
FIG. 1 is a diagram for description of a process of optimizing a corner path of the invention.

In the invention, as illustrated in FIG. 1, an N02 block that commands curvilinear movement at a larger curvature than a first curvature and a second curvature is interposed between an N01 block that commands rectilinear movement or curvilinear movement at the first curvature which is relatively small and the N03 block that commands rectilinear movement or curvilinear movement at the second curvature which is relatively small. When a corner path, a tangential direction of which is continuous, is formed by a series of blocks, a curved correction path is generated. Here, the curved correction path turns inward with a tolerance (allowable error amount) serving as a limit when viewed from an intermediate point of a command path based on the N02 block. In this way, a sufficient inward turning amount in the whole corner path is ensured by replacing the command path based on the N02 block included in the corner path with the correction path, and the corner path may be optimized at a corner of tangent continuity.

For example, when a shift point is determined such that the shift point is obtained by shifting the intermediate point of the command path based on the N02 block by a shift amount limited by a tolerance L preset to be perpendicular to a tangent line of the corner path passing through the intermediate point and in an inward direction in the corner path, the correction path may be set to a curve passing through the shift point, and a start point and an end point of the command path based on the N02 block. In this instance, the curve of the correction path may be obtained as a circular arc or an N-shaped curve.

Figure 2:
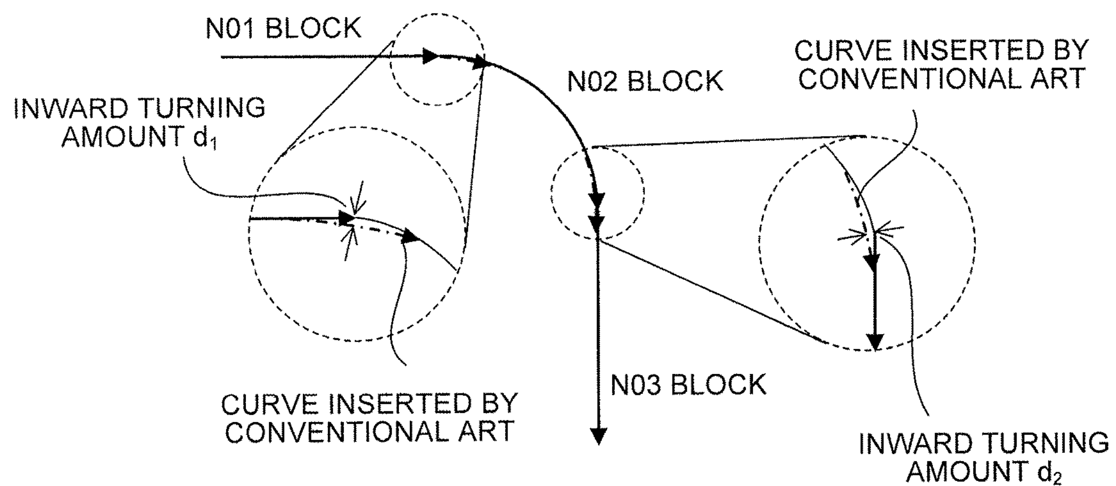
FIG. 2 is a diagram for description of a process of optimizing the corner path of the invention.
Figure 2:
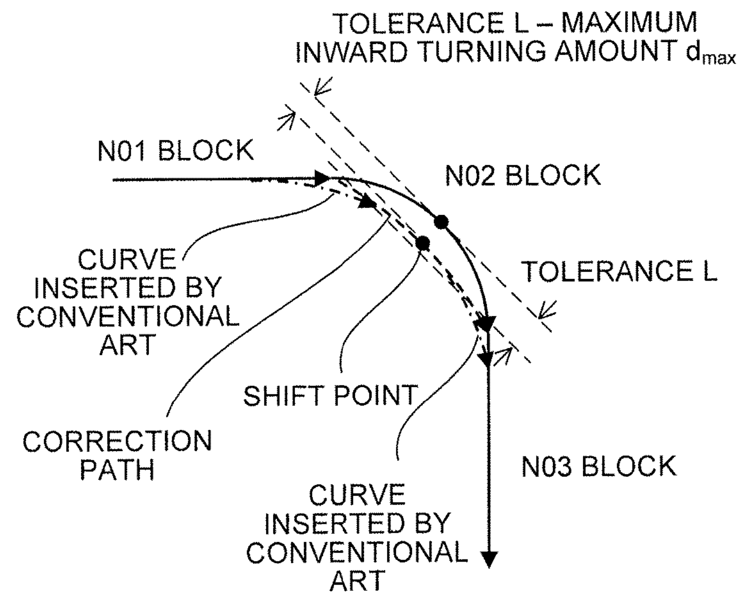

Alternatively, as illustrated in FIG. 2, when curves are inserted between the N01 block and the N02 block and between the N02 block and the N03 block, respectively, using a conventional art for inserting a curve between blocks as disclosed in JP 2014-21759 A, a point shifted in an inward direction in the corner path using a value, which is obtained by subtracting an inward turning amount $d_{max}$ corresponding to a larger one in inward turning amounts $d_1$ and $d_2$ from the tolerance L, as a limit may be set to the shift point. In this way, even when curves are inserted between the N01 block and the N02 block and between the N02 block and the N03 block, respectively, using the conventional art by setting the tolerance to $d_{max}$ after the command path based on the N02 block is replaced by the correction path, the corrected corner path may fall within the tolerance L when viewed from the intermediate point of the command path based on the N02 block.

Hereinafter, a description will be given of a configuration of a numerical controller of the invention which optimizes the corner path.

Figure 3:
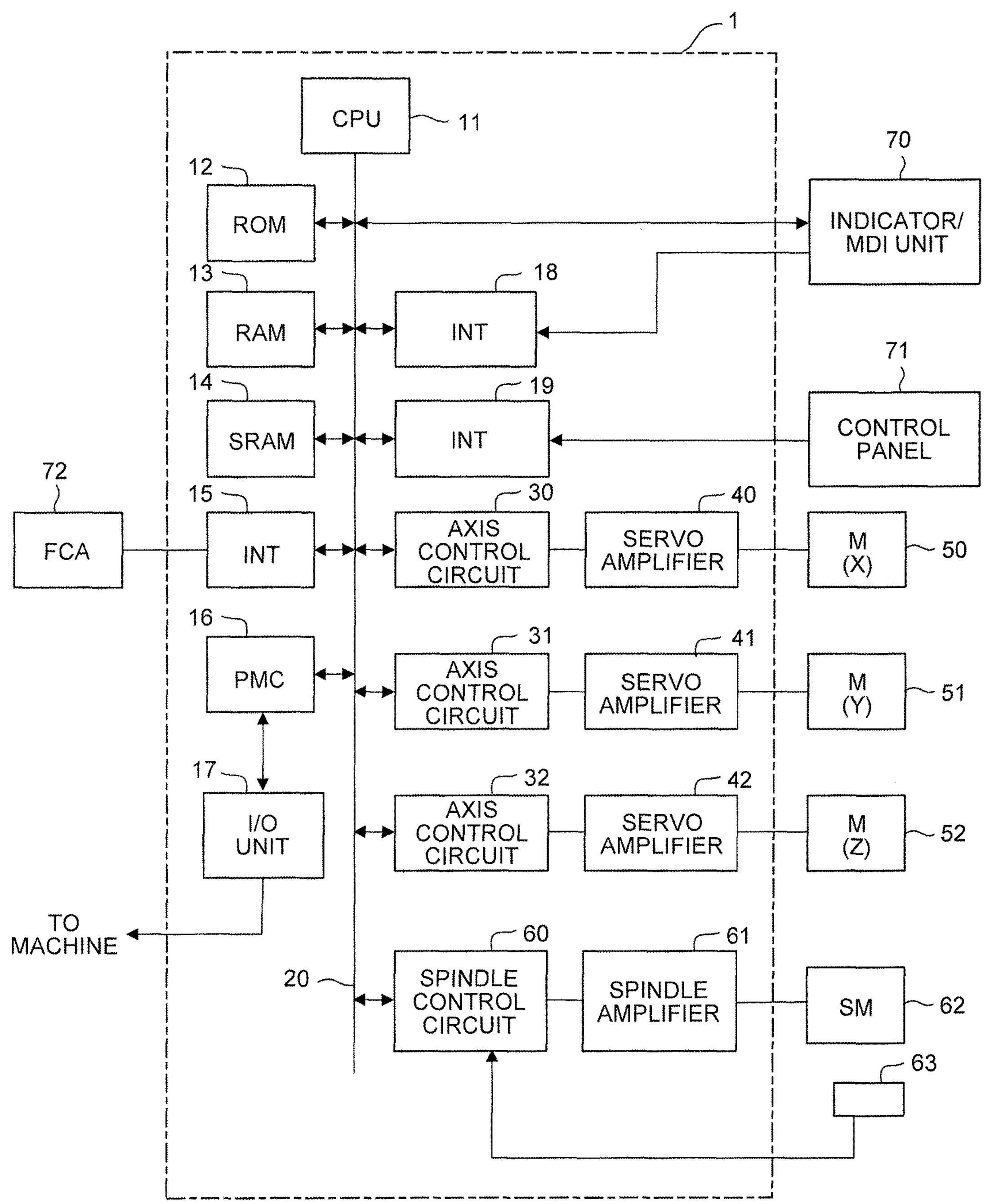
FIG. 3 is a block diagram illustrating a main part of a numerical controller according to an embodiment of the invention.

FIG. 3 is a hardware block diagram illustrating a main part of a numerical controller according to an embodiment of the invention. A central processing unit (CPU) 11 included in the numerical controller 1 is a processor that generally controls the numerical controller 1. The CPU 11 reads a system program stored in a read only memory (ROM) 12 through a bus 20, and controls the whole numerical controller 1 according to the system program. A random access memory (RAM) 13 stores temporary calculation data or display data, various types of data input by an operator through an indicator/multiple document interface (MDI) 70, etc.

A static random access memory (SRAM) 14 is configured as a nonvolatile memory backed up by a battery (not illustrated) to maintain a storage state even when power of the numerical controller 1 is turned OFF. The SRAM 14 stores a processing program described below loaded through an interface 15, a processing program input through the indicator/MDI unit 70, etc. In addition, various system programs for implementing processing of an edit mode necessary for creation and edition of a processing program or processing for automatic operation are written to the ROM 12 in advance. Various processing programs such as a processing program that implements the invention may be input through the interface 15 or the indicator/MDI unit 70, and stored in the SRAM 14.

The interface 15 is an interface for connection between the numerical controller 1 and external equipment 72 such as an adapter. A processing program, various parameters, etc. are loaded from the external equipment 72 side. In addition, a processing program edited inside the numerical controller 1 may be stored in external storage means through the external equipment 72. A programmable machine controller (PMC) 16 outputs a signal to auxiliary equipment of the machine tool (for example, an actuator such as a robotic hand for tooling exchange) through an I/O unit 17 using a sequence program embedded in the numerical controller 1, and performs a control operation. In addition, the PMC 16 receives a signal of various switches of a control panel disposed in a main body of the machine tool, performs necessary signal processing, and then forwards the signal to the CPU 11.

The indicator/MDI unit 70 is a manual data input device including a display, a keyboard, etc., and the interface 18 receives a command and data from the keyboard of the indicator/MDI unit 70, and forwards the received command and data to the CPU 11. An interface 19 is connected to a control panel 71 including a manual pulse generator, etc.

Axis control circuits 30 to 32 of respective axes receive movement command amounts for the respective axes from the CPU 11, and outputs commands for the respective axes to servo amplifiers 40 to 42. The servo amplifiers 40 to 42 receive the commands, and drive servomotors 50 to 52 of the respective axes. The servo motors 50 to 52 of the respective axes incorporate a position/speed detector, feed a position/speed feedback signal from the position/speed detector back to the axis control circuits 30 to 32, and perform a position/speed feedback control operation. Feedback of a position/speed is omitted in the block diagram.

A spindle control circuit 60 receives a maim axis rotation command to the machine tool, and outputs a spindle speed signal to a spindle amplifier 61. The spindle amplifier 61 receives the spindle speed signal to rotate a main axis motor 62 of the machine tool at a commanded rotation speed, thereby driving the tool.

A position coder 63 is combined with the main axis motor 62 by a gear, a belt, etc., the position coder 63 outputs a feedback pulse in synchronization with rotation of a main shaft, and the feedback pulse is read by the CPU 11.

Figure 4:
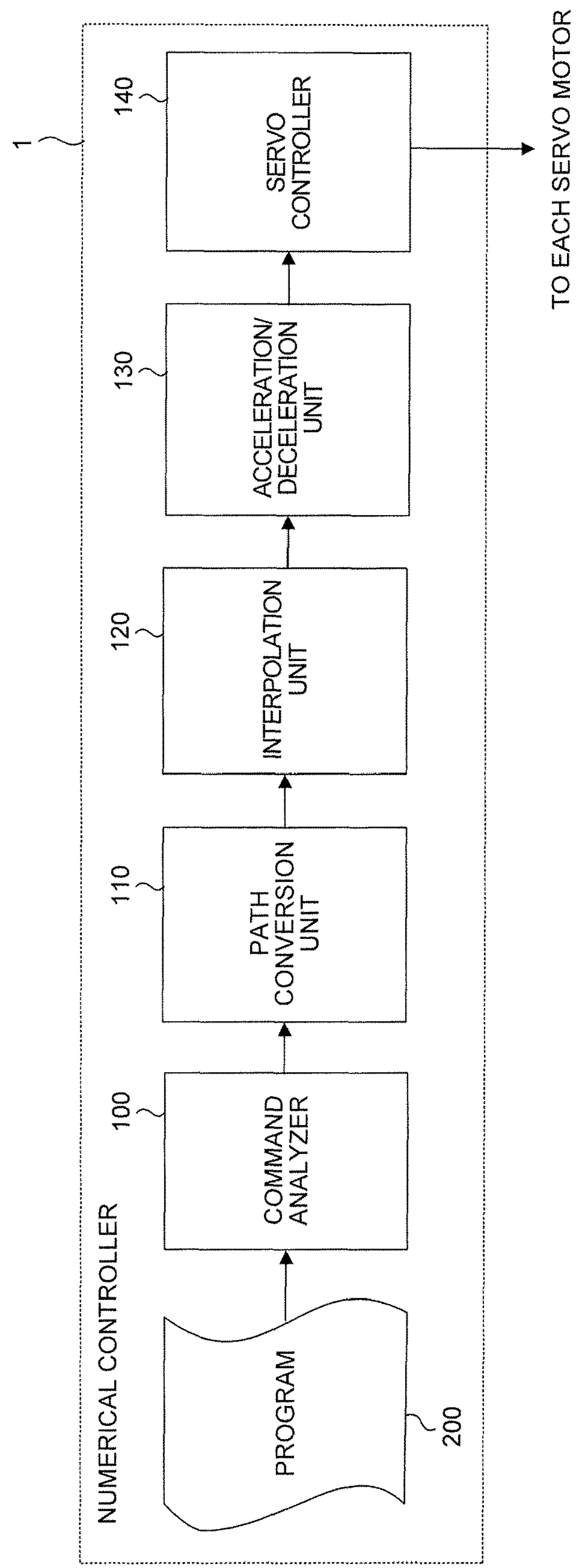
FIG. 4 is a schematic functional block diagram of the numerical controller according to the embodiment of the invention.

FIG. 4 illustrates a schematic functional block diagram when a function of the process of optimizing the corner path described above is implemented as a system program in the numerical controller 1 illustrated in FIG. 3. The numerical controller 1 includes a command analyzer 100, a path conversion unit 110, an interpolation unit 120, an acceleration/deceleration unit 130, and a servo controller 140.

The command analyzer 100 successively reads and analyzes blocks from a program 200 stored in a memory (not illustrated), creates command data that commands movement of each axis based on an analysis result, and outputs the created command data together with the analysis result to the path conversion unit 110.

The path conversion unit 110 is functional means that executes the process of optimizing the corner path described above. The path conversion unit 110 retrieves presence of a corner path, a tangential direction of which formed by the above-described three blocks is continuous, on a movement path from the analysis result received from the command analyzer 100. When the corner path, the tangential direction of which formed by the three blocks is continuous, is present on the movement path, the path is replaced by generating a correction path using the above-described scheme, and command data after correction as a result of replacement is output to the interpolation unit 120. In addition, the path conversion unit 110 may further perform a process of inserting a curve between blocks using a conventional art.

The interpolation unit 120 generates interpolation data obtained by performing interpolation calculation on a point on a command path commanded by movement command data at an interpolation period based on the command data after correction output from the path conversion unit 110, and outputs the generated interpolation data to the acceleration/deceleration unit 130.

The acceleration/deceleration unit 130 performs post-interpolation acceleration and deceleration processing on the interpolation data output by the interpolation unit 120 to calculate a speed of each driving shaft for each interpolation period, and outputs result data to the servo controller 140.

Then, the servo controller 140 controls driven portions (servo motors 50 to 52) of the respective axes of the tool to be controlled based on the output of the acceleration/deceleration unit 130.

Figure 5:
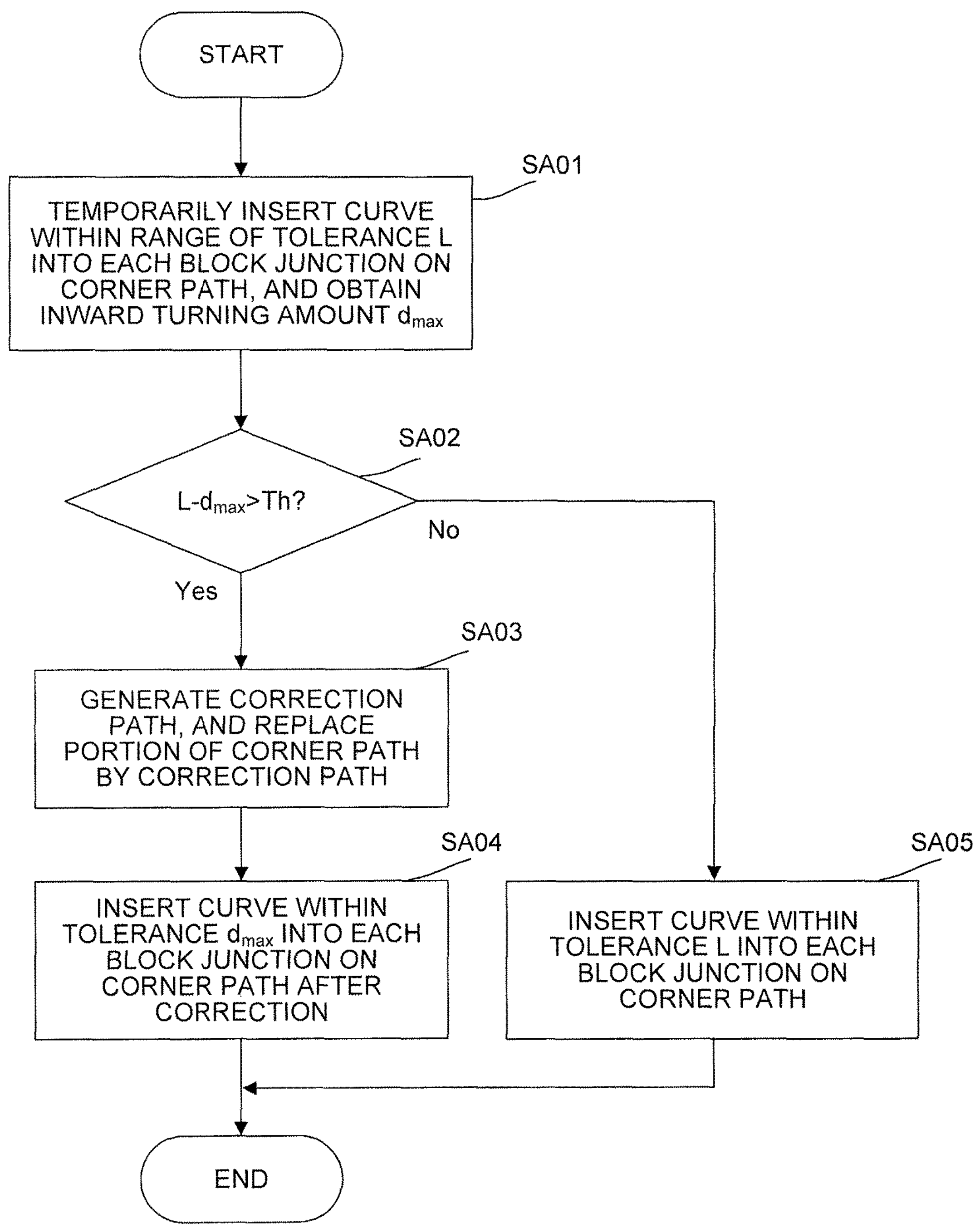
FIG. 5 is a flowchart of a process of optimizing the corner path executed by a path conversion unit 110 of FIG. 4.
Figure 6:
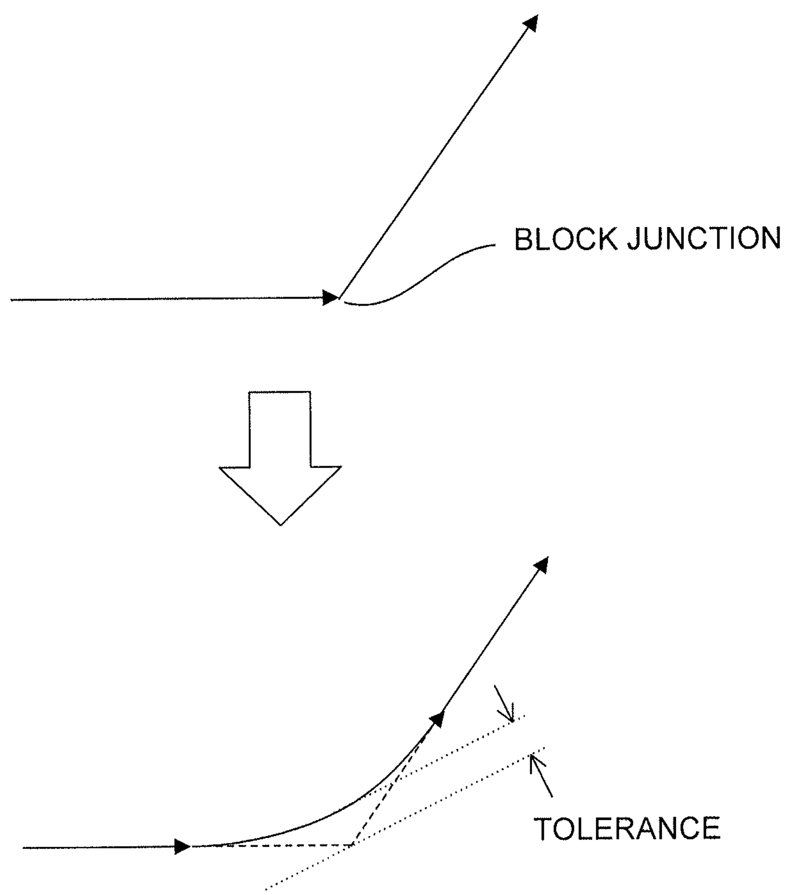
FIG. 6 is a diagram for description of insertion of a curve into a block junction in a conventional art.
Figure 7:
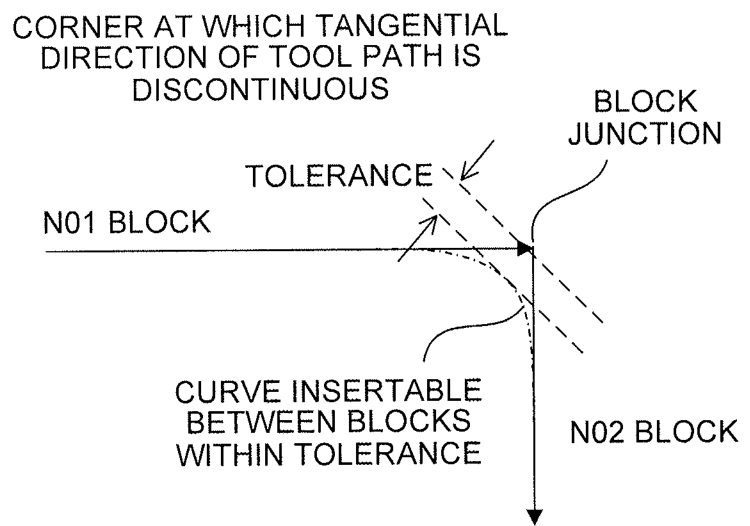
FIG. 7 is a diagram for description of a problem in insertion of the curve into the block junction in the conventional art.
Figure 7:
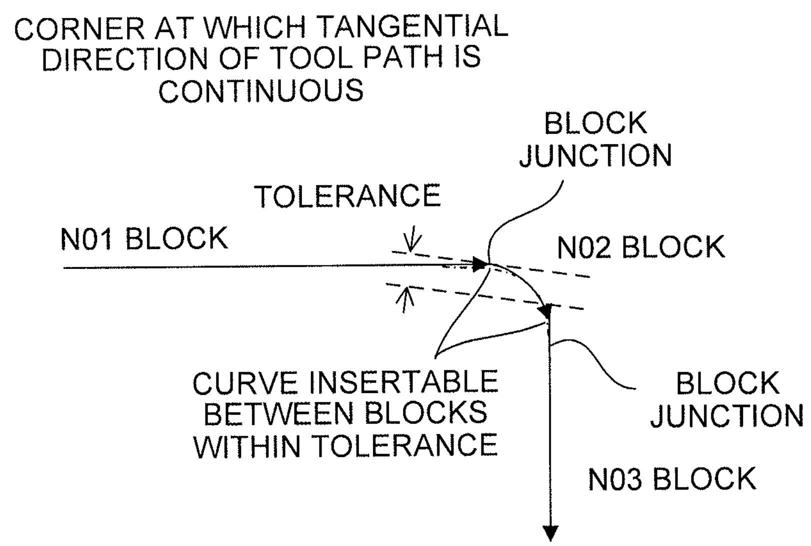

FIG. 5 is a flowchart illustrating a schematic flow of the process of optimizing the corner path executed by the path conversion unit 110.

[Step SA01] The path conversion unit 110 temporarily inserts a curve into each block junction within a range of the tolerance L in advance using a predetermined algorithm according to a conventional art in the corner path formed by the three blocks, obtains an inward turning amount (the above-described inward turning amounts $d_1$ and $d_2$) at each block junction in this case, and obtains a maximum inward turning amount $d_{max}$ in the inward turning amounts.

[Step SA02] The path conversion unit 110 determines whether a value obtained by subtracting the maximum inward turning amount $d_{max}$ obtained in step SA01 from the preset tolerance L is greater than or equal to a predetermined threshold value Th set in advance. When the value is greater than the threshold value Th, it is determined that a sufficient inward turning amount may not be obtained (the tangential direction of the corner path is continuous) in the conventional art, and the operation proceeds to step SA03. When the value is smaller than the threshold value Th, the sufficient inward turning amount is obtained in the conventional art, and thus the operation proceeds to step SA05.

[Step SA03] The path conversion unit 110 generates a correction path using the scheme described in FIG. 2, and a portion of the corner path (a command path by a block corresponding to the above-described N02 block) is replaced by the generated correction path.

[Step SA04] The path conversion unit 110 inserts a curve into each block junction on the corner path after correction using a predetermined algorithm according to the conventional art within a tolerance $d_{max}$.

[Step SA05] The path conversion unit 110 inserts a curve into each block junction on the corner path using a predetermined algorithm according to the conventional art within the preset tolerance L.

The threshold value Th used in step SA02 of the flowchart of FIG. 5 may be set to a value in a range of 0 to the tolerance L. When the threshold value Th is set to 0, and when the inward turning amount at the time of inserting the curve according to the conventional art is less than the amount of tolerance L, the path is inevitably replaced by the correction path according to the process of optimizing the corner path of the invention.

In the flowchart of FIG. 5, a process of inserting the curve into each block junction on the corner path is performed using the predetermined algorithm according to the conventional art after the path is replaced by the correction path, and thus a shift amount, at which an intermediate point of a center block among the three blocks is shifted, is set to $(L-d_{max})$ when the correction path is generated in step SA03. However, when the process of inserting the curve into each block junction on the corner path using the predetermined algorithm according to the conventional art is not performed after the path is replaced by the correction path (process of step SA04 is not performed), an appropriate value within the limit of the preset tolerance L may be used as the shift amount, at which the intermediate point of the center block among the three blocks is shifted, when the correction path is generated in step SA03.

Hereinbefore, the embodiment of the invention has been described. However, the invention is not restricted only to an example of the above-described embodiment, and may be implemented in various modes by appropriately making alternations.

For example, even though a description has been given of a case in which the path conversion unit 110 is configured as different functional means from the command analyzer 100 in the functional block diagram of FIG. 4, the path conversion unit 110 may be mounted as sub-functional means of the command analyzer 100. In this configuration, the process of optimizing the corner path may be performed while analyzing a command block.

Hereinbefore, the embodiment of the invention has been described. However, the invention is not restricted only to an example of the above-described embodiment, and may be implemented in various modes by appropriately making alternations.

The invention claimed is:

1. A numerical controller controlling a machine tool processing a workpiece based on a program including a plurality of blocks, the numerical controller comprising a path conversion unit for obtaining a curved correction path passing through three points corresponding to a start point of a third block, an end point of the third block, and a shift point obtained by shifting an intermediate point of a command path based on the third block in an inward direction of a corner path within a limit of a preset allowable error amount when the corner path is formed by a series of blocks included in the program and a tangential direction of the corner path is continuous, and generating a path obtained by replacing the command path of the third block included in the corner path by the correction path, the third block commanding curvilinear movement at a larger curvature than a first curvature and a second curvature being interposed between the first block commanding rectilinear movement or curvilinear movement at the first curvature corresponding to a small curvature and the second block commanding rectilinear movement or curvilinear movement at the second curvature corresponding to a small curvature in the series of blocks.

2. The numerical controller according to claim 1, wherein the path conversion unit calculates a first inward turning amount when a curve is inserted between the first block and the third block using a predetermined algorithm, and a second inward turning amount when a curve is inserted between the third block and the second block using a predetermined algorithm, and sets a point obtained by shifting an intermediate point of a tool path commanded by the third block in the inward direction of the corner path by a shift amount to the shift point, the shift amount being obtained by subtracting a larger inward turning amount in the first inward turning amount and the second inward turning amount from the allowable error amount.

* * * * *